Aug. 13, 1963  J. L. HENRY  3,100,338
METHOD OF JOINING
Filed April 21, 1958
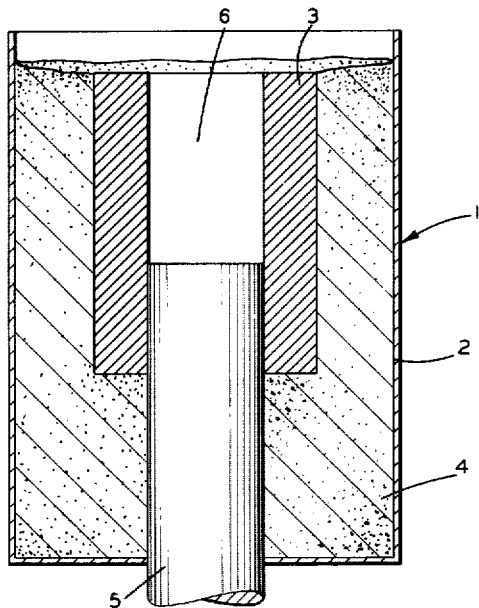
FIG_1_
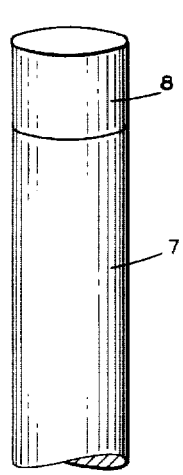 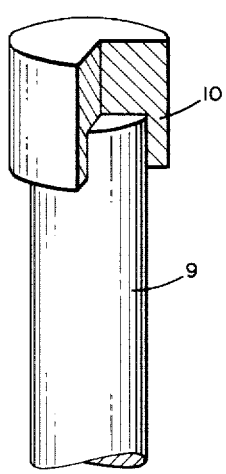 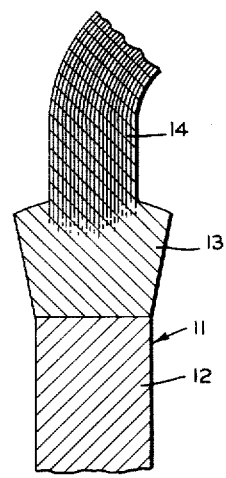
FIG_2_ FIG_3_ FIG_4_
INVENTOR.
JACK L. HENRY
BY
*James E. Toomey*

United States Patent Office 3,100,338
Patented Aug. 13, 1963

3,100,338
METHOD OF JOINING
Jack L. Henry, Los Altos, Calif., assignor to Kaiser Aluminum & Chemical Corporation, Oakland, Calif., a corporation of Delaware
Filed Apr. 21, 1958, Ser. No. 729,621
20 Claims. (Cl. 29—473.1)

This invention relates generally to the joining of metals to refractory hard metal material. More particularly, it relates to the joining of aluminum metal to refractory hard metals and to a flux composition for use in said joining.

The expression "aluminum" as used in the specification and claims means high purity aluminum metal and aluminum alloys wherein the aluminum amount is 99% by weight or better, for example, Alloy 1100 wherein the minimum aluminum content is 99% by weight and E.C. (electrical conductor) Alloy wherein the minimum aluminum content is 99.45% by weight.

Joints can be made between aluminum and refractory hard metals by casting molten metal onto the refractory hard metal; however, this procedure oftentimes results in a bond which is both mechanically weak and has low electrical conductivity. A joint can also be made by first coating the refractory hard metal surface with an electroplated coating, e.g. nickel, and then joining the refractory member to an aluminum member by soldering or brazing or by casting molten aluminum onto the electroplated refractory member. This results in a bond between the aluminum metal and the refractory hard metal which has better characteristics than the former method; however, both the mechanical strength and the electrical conductivity characteristics are still not as good as desired since there is a tendency for the aluminum to break away from the refractory hard metal during use.

As refractory hard metal members are finding increasing use as current-conducting elements, e.g. cathodic elements, in aluminum reduction cells, it is mandatory that a joint having both superior electrical and mechanical characteristics be made between the refractory hard metal member and an aluminum metal member for effecting the current connection to the refractory hard metal member. Accordingly, it is the primary purpose and object of the present invention to provide a joining method and a flux composition for use therein for the making of joints between aluminum metal and refractory hard metals which joints have superior mechanical strength and electrical conductivity characteristics.

It is a further object of this invention to provide a flux composition for effecting superior joints between refractory hard metals and aluminum metal.

It is also an object of this invention to provide a joint between aluminum metal and refractory hard metals, which joint has superior mechanical strength and electrical conductivity characteristics.

It is a still further object of this invention to provide a connection between aluminum flex member and a refractory hard metal member, which connection has superior mechanical and electrical conductivity characteristics.

These and other objects and advantages of the instant invention will be apparent from the ensuing description thereof.

As used herein in the specification and the claims, the expression "refractory hard metal" refers to a material which desirably possesses a low electrical resistivity, a low solubility in molten aluminum and molten electrolyte under cell operating conditions, is wettable by molten aluminum under cell operating condtions and has good stability under the conditions existing at the cathode of a reduction cell. The preferred refractory hard metal material for the practice of the invention is that which consists essentially of at least one of the materials selected from the group consisting of the carbides and borides of titanium, zirconium, tantalum and niobium and mixtures thereof, such materials being found to exhibit all or substantially all of the above properties.

The expression "consists essentially" as used hereinafter in the specification and claims means that the refractory hard metal material of the carbides and borides referred to above does not contain other substances in amounts sufficient to materially affect the desirable characteristics of the material, although other substances may be present in minor amounts which do not materially affect such desirable characteristics, for example, small proportions of oxygen, nitrogen and iron in titanium boride.

According to this invention, the refractory hard metal member is first cleaned by a suitable method and then is preheated to a high temperature and while at that temperature is contacted with the molten flux of the invention. The molten flux, which has a specific gravity less than that of aluminum, is preferably brushed on the refractory hard metal member surfaces by suitable means, e.g. a steel bristle brush. Then the refractory hard metal and surface is contacted with molten aluminum and is preferably brushed with the molten aluminum. Thereafter, the assembly of refractory hard metal and molten aluminum is allowed to cool.

In the accompanying drawings there is illustrated, by way of example, suitable apparatus for carrying out the method of the invention as well as novel embodiments of a connection.

FIGURE 1 is a vertical elevation view in section showing a casting assembly.

FIGURE 2 is a perspective view showing a refractory hard metal member and an aluminum metal member joined according to the invention and wherein the cross-sectional area of the aluminum member is substantially the same as the cross-sectional area of the refractory hard metal member.

FIGURE 3 is a perspective view partly in section showing a refractory hard metal member and an aluminum member joined according to the invention and wherein the aluminum member forms a sheath over the extremity of the refractory hard metal member.

FIGURE 4 depicts a connection between a flexible aluminum member and a refractory hard metal member, which connection is a further embodiment of the invention.

In the joining of the refractory hard metal member to aluminum, the refractory member is preheated to a temperature in excess of the melting point of aluminum, preferably from 750° to 900° C. Prior to such preheating, the portion of the surface of the refractory hard metal member where the joint is to be made is preferably cleaned by a suitable method, such as cathodic electrocleaning in hot 10% sodium hydroxide solution followed by pickling in a hot dilute $HNO_3$=HF solution. While the refractory hard metal member is at the preheating temperature, the surface to be bonded is contacted, in a suitable joining container, with molten flux of the invention which has a melting range of 660° to 680° C. To insure good contact, it is desirable to scrub the surface of the refractory hard metal member with a brush in the presence of the molten flux.

After treatment with the molten flux the refractory hard metal member is contacted with molten aluminum, in the presence of the flux. The refractory hard metal and molten metal are then cooled. Preferably, the cooling is directional (from bottom up) which is promoted by cooling the refractory hard metal member slowly while delaying the cooling of the aluminum, e.g., by maintaining heat on the aluminum surface. This promotes directional solidification of the aluminum metal towards the aluminum surface which is most remote from the joint and gives a good solid bond with no shrinkage cavities between the refractory hard metal member and the aluminum.

A flux for the purpose of removing oxide film, scale and dross from the refractory hard metal surface should have the following properties: (1) low melting point range, i.e., not over about 680° C., (2) ability to dissolve aluminum oxide and other metal oxides at this low temperature, (3) a density lower than that of molten aluminum at the same temperature (4) low volatility, (5) non-hygroscopic, (6) relatively inexpensive and (7) easy to produce.

It has been found that these requirements are satisfied by a flux composition consisting essentially of the fluorides of sodium, aluminum and lithium, and sodium chloride. The following flux compositions have been found to be particularly satisfactory:

*Flux A*

| | Weight percent |
|---|---|
| Sodium cryolite ($Na_3AlF_6$) | 47 to 53 |
| Lithium fluoride (LiF) | 22 to 28 |
| Sodium chloride (NaCl) | 15 to 30 |

The preferred composition of flux A is:

| | |
|---|---|
| Sodium cryolite ($Na_3AlF_6$) | 50 |
| Lithium fluoride (LiF) | 25 |
| Sodium chloride (NaCl) | 25 |

*Flux B*

| | |
|---|---|
| Lithium aluminum fluoride ($Li_3AlF_6$) | 43 to 51 |
| Sodium cryolite ($Na_3AlF_6$) | 27 to 35 |
| Sodium chloride (NaCl) | 15 to 30 |

The preferred composition of Flux B is a eutectic mixture of lithium aluminum fluoride (lithium cryolite) and sodium cryolite, 48% $Li_3AlF_6$ and 32% $Na_3AlF_6$ together with 20% NaCl. This flux may be made by fusing together the following mixture:

| | Percent |
|---|---|
| Sodium cryoilte ($Na_3AlF_6$) | 32 |
| Aluminum fluoride (AlF) | 24.9 |
| Lithium fluoride (LiF) | 23.1 |
| Sodium chloride (NaCl) | 20 |

It is to be understood that, while in the foregoing examples the double salt $Na_3AlF_6$ (cryolite) is given, an equivalent amount of this component may be supplied in the form of the single salts, sodium fluoride and aluminum fluoride. The flux components should be of technical grade or higher in purity.

The flux components preferably should be of a particle size of minus 28 mesh and should be thoroughly mixed. The mixed flux components may be charged dry to the joining container which has been preheated to the preheat temperature. In this case, the joining container must remain at temperature for a time sufficient to permit melting of the flux. If desired, the flux components can be fused and charged while molten into the joining container, or the mixed flux components can be fused, mixed, frozen, ground and then the resulting powdered flux charged to the preheating joining container. Alternatively, the flux components may be fused, mixed, frozen, ground, re-fused and then charged as molten flux to the preheated joining container.

The density of the flux when molten is less than that of molten aluminum so that the flux floats out of the mold during casting of the molten aluminum.

FIGURE 1 is an elevation view partly in section of a casting assembly 1 suitable for the practice of the invention. Casting assembly 1 comprises a steel container 2 and a graphite mold 3 disposed within container 2. Between mold 3 and container 2 is disposed a suitable packing material 4, e.g., floury alumina. Refractory hard metal bar 5, at the extremity to be joined to aluminum metal, is disposed within mold cavity 6 of mold 3.

FIGURE 2 shows a refractory hard metal member 7 joined to an aluminum member 8. The cross-sectional area of the aluminum member 8 is substantially the same as that of the refractory hard metal member 7.

In FIGURE 3 there is depicted a refractory hard metal member 9 joined to an aluminum member 10 wherein the aluminum member forms a sheath over the extremity of the refractory hard metal member 9. The cross-sectional area of member 10 is greater than that of member 9 and can be formed by employing a mold of suitable inner cross-sectional area in relation to the cross-sectional area of the refractory hard metal member.

In an example of the invention, a titanium diboride ($TiB_2$) member two inches in diameter, after being subjected to cathodic cleaning in hot 10% sodium hydroxide solution followed by pickling in a hot dilute $HNO_3=HF$ solution, was set vertically in a graphite mold having an inside diameter of about two inches, and this assembly was packed in floury alumina in a steel container, similar to the casting assembly shown in FIG. 1. The casting assembly was preheated to above 800° C. in a furnace. A small amount of the flux of the composition, set forth above as preferred composition of Flux B, was then placed into the mold cavity and allowed to melt. The flux was brushed on the titanium boride surface with a steel bristle brush. At this point a small amount of molten aluminum (electrical conductor grade aluminum having a nominal composition of 99.45% aluminum) was placed in the cavity and the bar was brushed again to "tin" the surface. After this, the mold cavity was filled with molten aluminum at 800° C. and allowed to cool with the top elements of the casting furnace turned on to induce directional cooling. After cooling, the refractory hard metal member and aluminum cap member were removed from the furnace and the joint was found to possess superior mechanical strength and electrical conductivity characteristics.

In mechanical testing of joints made as above, the refractory hard metal and cast aluminum member was placed in a testing frame wherein the entire member was supported near the ends and loaded at the joint by means of a hydraulic ram. From the force required to break the joint and the length of the span, the modulus of rupture was calculated. In the vast majority of cases it has been found that the bar system will break in the refractory hard metal body, clearly indicating that the joint is stronger than the refractory hard metal phase adjacent the joint.

In electrical testing, the voltage drop across the joint was measured by suitable apparatus, e.g., a potentiometer. From the joint voltage drop and the current the joint resistance can be calculated. In determining the joint voltage drop a potential traverse method was employed wherein voltage drops are measured at increasing one half inch intervals while traversing the refractory hard metal member and aluminum casting from each extremity thereof across the joint location, the voltage drops of each traverse are then plotted against the distance from the joint, and the difference or distance (joint voltage drop) between the two traverses at the joint location is measured. By employing the potential traverse method for determining joint voltage drop, it was found that the joints produced by the method of the invention have joint resistances less than 0.1 microhm, and generally less than 0.05 microhm. These resistances are negligible for all practical purposes and indicate complete or substantially complete wetted contact between the refractory hard metal material and the aluminum metal.

In certain instances it may be desirable to plate a thin coating of a suitable metal on the refractory hard metal surface prior to the casting of the aluminum cap. Nickel and cobalt are examples of suitable metals for the plating. A thin nickel plating, e.g., about 0.0005 inch, will supply airburn protection during the preheating of the refractory hard metal. After cathodic cleaning of the refractory hard metal in hot 10% sodium hydroxide followed by a pickling in a hot dilute $HNO_3=HF$ solution, the refractory hard metal surface may be electroplated in a low pH Watts bath. After electroplating, the refractory hard metal bar is placed in the casting assembly and preheated and contacted and brushed with flux and molten aluminum as described in the above example.

Refractory hard metal members of titanium diboride ($TiB_2$) with additions of titanium carbide (TiC) ranging from 10 to 40% were joined to aluminum members in the manner described in the above example. In all cases the joints were found to possess superior mechanical strength and electrical conductivity characteristics in comparison to prior art techniques.

An embodiment which is within the scope of the instant invention is the joining of an aluminum flexible connection to a refractory hard metal bar. A flexible connection of this type has desirable application, e.g. for connecting the cathode lead to the cathode bus in a reduction furnace. The presently used method of connecting a flex to a refractory hard metal bar is by welding the end of the flex to the aluminum metal cap which has been cast onto the end of the bar. The welding operation is expensive since the refractory hard metal and aluminum cap must be preheated and the welding carefully executed to control thermal shock to the refractory hard metal material. By the instant embodiment, this welding step can be eliminated. A connection made according to the invention is shown as 11 in FIG. 4 wherein 12 designates the refractory hard metal member, 13 the cast aluminum metal cap member and 14 a flex comprising multiple leaves of aluminum. In making this connection the aluminum cap is cast onto the refractory hard metal as described above. However, before the aluminum metal has solidified, one end of the flex, which has been preheated and pre-fluxed in molten flux of the invention, is set into the molten aluminum. Alternatively, the end of the flex could be preheated and disposed in the container holding the refractory hard metal member and molten flux and thereafter the molten aluminum cast onto the refractory hard metal and about the end of the flex. The connection is then allowed to cool in the same manner as described previously.

In an example illustrating this embodiment, a three-inch diameter titanium diboride bar was set into a casting assembly similar to that shown in FIG. 1. The fluxing and casting steps were the same as those described with regard to the previous example. The flex used consisted of 60 leaves of 0.026 inch aluminum, 2.5 inches wide. The leaves were held together by a steel band three inches from the end. While the cast aluminum was still molten, the end of the flex, which had been preheated to 600° C. and dipped in the molten flux of the invention (held at 700° C.), was set in the cast, and the flex held rigidly in place. Directional cooling was employed; that is, heat was applied to the molten aluminum surface during cooling. It was found that the resistance of the connection over a span across the joint of approximately 2 inches was only 0.33 microhm.

Various changes and modifications of the instant invention may be made without departing from the principles and spirit of the invention.

What is claimed is:

1. A method of obtaining a joint between a refractory hard metal member and an aluminum member comprising the steps of cleaning the portion of the surface of said hard metal refractory member where the joint is to be made, preheating said refractory hard metal member to a temperature above the melting point of aluminum, contacting the surface of said hard metal refractory member while at said preheating temperature with a molten flux consisting essentially of the fluorides of sodium, aluminum and lithium and sodium chloride, contacting said refractory hard metal member with molten aluminum, and then cooling said refractory hard metal member and molten aluminum, thereby forming a joint.

2. A method of obtaining a joint between a refractory hard metal member and an aluminum member comprising the steps of cleaning the portion of the surface of said refractory hard metal member where the joint is to be made, preheating said refractory hard metal member to a temperature above the melting point of aluminum, contacting the surface of said refractory hard metal member while at said preheating temperature with a molten flux composition consisting essentially of, in percent by weight, about 43 to 51% $Li_3AlF_6$, about 27 to 35% $Na_3AlF_6$ and about 15 to 30% NaCl, contacting said refractory hard metal member with molten aluminum, and then cooling said refractory hard metal member and molten aluminum, thereby forming a joint.

3. A method of obtaining a joint between a refractory hard metal member and an aluminum member comprising the steps of cleaning the portion of the surface of said refractory hard metal member where the joint is to be made, preheating said refractory hard metal member to a temperature above the melting point of aluminum, contacting the surface of said refractory hard metal member while at said preheating temperature with a molten flux composition consisting essentially of, in percent by weight, about 47 to 53% $Na_3AlF_6$, about 22 to 28% LiF and about 15 to 30% NaCl, contacting said refractory hard metal member with molten aluminum, and then cooling said refractory hard metal member and molten aluminum, thereby forming a joint.

4. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said hard metal refractory member where the joint is to be made, preheating said refractory hard metal member to a temperature above the melting point of aluminum, contacting the surface of said hard metal refractory member while at said preheating temperature with a molten flux consisting essentially of the fluorides of sodium, aluminum and lithium, and sodium chloride, contacting said refractory hard metal member with molten aluminum, and then cooling said refractory hard metal member and molten aluminum, thereby forming a joint.

5. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, preheating said refractory hard metal member to a temperature above the melting point of aluminum, contacting the surface of said refractory hard metal member while at said preheating temperature with a molten flux composition consisting essentially of, in percent by weight, about 43 to 51% $Li_3AlF_6$ about 27 to 35% $Na_3AlF_6$ and about 15 to 30% NaCl, contacting said refractory hard metal member with molten aluminum, and then cooling said refractory hard metal member and molten aluminum, thereby forming a joint.

6. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, preheating said refractory hard metal member to a temperature above the melting point of aluminum, contacting the surface of said refractory hard metal member while at said preheating temperature with a molten flux consisting essentially of, in percent by weight, about 47 to 53% $Na_3AlF_6$, about 22 to 28% LiF and about 15 to 30% NaCl, contacting said refractory hard metal member with molten aluminum, and then cooling said refractory hard metal member and molten aluminum, thereby forming a joint.

7. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, preheating said refractory hard metal member to a temperature above the melting point of aluminum, contacting and brushing the surface of said refractory hard metal member while at a said preheating temperature with a molten flux consisting essentially of the fluorides of sodium, aluminum and lithium and sodium chloride, contacting and brushing the surface of said refractory hard metal member with molten aluminum, and then directionally cooling said refractory hard metal member and molten aluminum by slowly cooling said refractory hard metal member while delaying the cooling of said aluminum, thereby forming a joint.

8. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, preheating said refractory hard metal member to a temperature above the melting point of aluminum, contacting and brushing the surface of said refractory hard metal member while at said preheating temperature with a molten flux consisting essentially of, in percent by weight, about 43 to 51% $Li_3AlF_6$, 27 to 35% of $Na_3AlF_6$, and about 15 to 30% NaCl, contacting and brushing the surface of said refractory hard metal member with molten aluminum, and then directionally cooling said refractory hard metal member and molten aluminum by slowly cooling said refractory hard metal member while delaying the cooling of said aluminum, thereby forming a joint.

9. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, preheating said refractory hard metal member at a temperature above the melting point of aluminum, contacting and brushing the surface of said refractory hard metal member while at said preheating temperature with a molten flux consisting essentially of, in percent by weight, about 47 to 53% $Na_3AlF_6$, about 22 to 28% LiF and about 15 to 30% NaCl, contacting and brushing the surface of said refractory hard metal member with molten aluminum, and then directionally cooling said refractory hard metal member and molten aluminum by slowly cooling said refractory hard metal member while delaying the cooling of said aluminum, thereby forming a joint.

10. A method of obtaining a joint between a refractory hard metal member, made of a material selected from the group consisting of the borides and carbides of titanium, zirconium, tantalum and niobium and mixtures thereof and an aluminum member, comprising the steps of cleaning the portion of the surface of said refractory hard metal member where the joint is to be made, plating the surface of said refractory hard metal member with a thin nickel coating, preheating said refractory hard metal member at a temperature above the melting point of aluminum, contacting and brushing the surface of said refractory hard metal member while at said preheating temperature with a molten flux composition comprising the fluorides of sodium, aluminum and lithium and sodium chloride, contacting and brushing the surface of said refractory hard metal member with molten aluminum, and then directionally cooling said refractory hard metal member and molten aluminum by slowly cooling said refractory hard metal member while delaying the cooling of said aluminum, thereby forming a joint.

11. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, plating the surface of said refractory hard metal member with a thin nickel coating, preheating said refractory hard metal member at a temperature greater than the melting point of aluminum, contacting and brushing the surface of said refractory hard metal member while at said preheating temperature with a molten flux consisting essentially of, in percent by weight, about 43 to 51% $Li_3AlF_6$, about 27 to 35% $Na_3AlF_6$, and 15 to 30% NaCl, contacting and brushing the surface of said refractory hard metal member with molten aluminum, and then directionally cooling said refractory hard metal member and molten aluminum by slowly cooling said refractory hard metal member while delaying the cooling of said aluminum, thereby forming a joint.

12. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, plating the surface of said refractory hard metal member with a thin nickel coating, preheating said refractory hard metal member at a temperature greater than the melting point of aluminum, contacting and brushing the surface of said refractory hard metal member while at said preheating temperature with a molten flux consisting essentially of, in percent by weight, about 47 to 53% $Na_3AlF_6$, about 22 to 28% LiF and about 15 to 30% NaCl, contacting and brushing the surface of said refractory hard metal member with molten aluminum, and then directionally cooling said refractory hard metal member and molten aluminum by slowly cooling said refractory hard metal member while delaying the cooling of said aluminum, thereby forming a joint.

13. A method for joining in current carrying relationship a refractory hard metal member, made of a material selected from the group consisting of the borides and carbides of titanium, zirconium, tantalum and niobium and mixtures thereof, to a flexible aluminum member, comprising the steps of cleaning the portion of the surface of said refractory hard metal member where the joint is to be made, preheating said refractory hard metal member at a temperature above the melting point of aluminum, contacting and brushing the surface of said refractory hard metal member while at said preheating temperature with a molten flux consisting essentially of the fluorides of sodium, aluminum and lithium and sodium chloride, contacting and brushing the surface of said refractory hard metal member with molten aluminum, preheating one end of an aluminum flex member, contacting the heated end of said flex member with said flux composition, immersing said end of said flex member into said molten aluminum, and then directionally cooling said refractory hard metal member, molten aluminum and aluminum flex member by slowly cooling said refractory hard metal member while delaying the cooling of said molten aluminum, thereby forming a joint.

14. A method for joining in current carrying relationship a refractory hard metal member, made of a material selected from the group consisting of the borides and carbides of titanium, zirconium, tantalum and niobium and mixtures thereof, to a flexible aluminum member, comprising the steps of cleaning the portion of the surface of said refractory hard metal member where the joint is to be made, preheating said refractory hard metal member at a temperature above the melting point of aluminum, contacting and brushing the surface of said refractory hard metal member while at said preheating temperature with a molten flux consisting essentially of, in percent by weight, about 43 to 51% $Li_3AlF_6$, about 27 to 35% $Na_3AlF_6$ and about 15 to 30% NaCl, contacting and brushing said surface of said refractory hard metal member with molten aluminum, preheating one end of said aluminum flex member, contacting said end of the flex member with said flux, immersing said end of said flex member into said molten aluminum, and then directionally cooling said refractory hard metal member, molten aluminum and aluminum flex member by slowly cooling said refractory hard metal member while delaying the cooling of said molten aluminum, thereby forming a joint.

15. A method for joining in current carrying relationship a refractory hard metal member, made of a material selected from the group consisting of the borides and carbides of titanium, zirconium, tantalum and niobium and mixtures thereof, with an aluminum flex member, comprising the steps of cleaning the portion of the surface of said refractory hard metal member where the joint is to be made, preheating said refractory hard metal member at a temperature above the melting point of aluminum, contacting and brushing the surface of said refractory hard metal member while at said preheating temperature with a molten flux composition consisting essentially of, in percent by weight, about 47 to 53% $Na_3AlF_6$, about 22 to 28% LiF and about 15 to 30% NaCl, contacting said refractory hard metal member with molten aluminum, preheating one end of said aluminum flex member, contacting said end of said flex member with said flux, immersing said end of said aluminum flex member into said molten aluminum, and then directionally cooling said refractory hard metal member, molten aluminum and aluminum flex member by slowly cooling said refractory hard metal member while delaying the cooling of said molten aluminum, thereby forming a point.

16. A method for joining in current carrying relationship a refractory hard metal member, made of a material selected from the group consisting of the borides and carbides of titanium, zirconium, tantalum and niobium and mixtures thereof, to a flexible aluminum member, comprising the steps of cleaning the portion of the surface of said refractory hard metal member where the joint is to be made, plating the surfaces of said refractory hard metal member with a thin nickel coating, preheating said refractory hard metal member at a temperature above the melting point of aluminum, contacting and brushing the surface of said refractory hard metal member while at said preheating temperature with a molten flux consisting essentially of the fluorides of sodium, aluminum and lithium and sodium chloride, contacting and brushing the surface of said refractory hard metal member with molten aluminum, preheating one end of an aluminum flex member, contacting said end of said aluminum flex member with said flux composition, immersing said end of said aluminum flex member into said molten aluminum, and then directionally cooling said refractory hard metal member, molten aluminum and aluminum flex member by slowly cooling said refractory hard metal member while delaying the cooling of said molten aluminum, thereby forming a joint.

17. A method for joining in current carrying relationship a refractory hard metal member, made of a material selected from the group consisting of the borides ad carbides of titanium, zirconium, tantalum and niobium and mixtures thereof, to an aluminum flex member, comprising the steps of cleaning the portion of the surface of said refractory hard metal member where the joint is to be made, plating the surface of said refractory hard metal member with a thin nickel coating, preheating said refractory hard metal member at a temperature above the melting point of aluminum, contacting and brushing the surface of said refractory hard metal member while at said preheating temperature with a molten flux composition consisting essentially of, in percent by weight, about 43 to 51% $Li_3AlF_6$, about 27 to 35% $Na_3AlF_6$ and about 15 to 30% NaCl, contacting and brushing the surface of said refractory hard metal member with molten aluminum, preheating one end of said flex member, contacting the heated end of the aluminum flex member with said flux, immersing said end of said flex member into said molten aluminum, and then directionally cooling said refractory hard metal member, molten aluminum and aluminum flex member by slowly cooling said refractory hard metal member while delaying the cooling of said molten aluminum, thereby forming a joint.

18. A method for joining in current carrying relationship a refractory hard metal member, made of a material selected from the group consisting of the borides and carbides of titanium, zirconium, tantalum and niobium and mixtures thereof, with an aluminum flex member, comprising the steps of cleaning the portion of the surface of said refractory hard metal member where the joint is to be made, plating the surfaces of said refractory hard metal member with a thin nickel coating, preheating said refractory hard metal member at a temperature above the melting point of aluminum, contacting and brushing the surface of said refractory hard metal member while at said preheating temperature with a molten flux composition consisting essentially of, in percent by weight, about 47 to 53% $Na_3AlF_6$, about 22 to 28% LiF and about 15 to 30% NaCl, contacting and brushing the surface of said refractory hard metal member with molten aluminum, preheating one end of said flex member, contacting the heated end of said flex member with said flux composition, immersing said end of said aluminum flex member into said molten aluminum, and then directionally cooling said refractory hard metal member, molten aluminum and aluminum flex member by slowly cooling said refractory hard metal member while delaying the cooling of said molten aluminum, thereby forming a joint.

19. A method of obtaining a joint between a refractory hard metal member, made of a material selected from the group consisting of the borides and carbides of titanium, zirconium, tantalum and niobium and mixtures thereof, and an aluminum member, comprising the steps of cleaning the portion of the surface of said refractory hard metal member where the joint is to be made, plating the surface of said refractory hard metal member with a nickel coating of about 0.0005 inch, preheating said refractory hard metal member at a temperature in the range of 750° to 900° C., contacting and brushing the surface of said refractory hard metal member while at said preheating temperature with a molten flux composition comprising, in percent by weight, 48% $Li_3AlF_6$, 32% $Na_3AlF_6$ and 20% NaCl, contacting and brushing the surface of said refractory hard metal member with molten aluminum, said aluminum being at a temperature of 800° C., and then directionally cooling said refractory hard metal member and molten aluminum by slowly cooling said refractory hard metal member while delaying the cooling of said aluminum, thereby forming a joint.

20. A method for joining in current carrying relationship a refractory hard metal member, made of a material selected from the group consisting of the borides and carbides of titanium, zirconium, tantalum and niobium and mixtures thereof, with an aluminum flex member, comprising the steps of cleaning the portion of the surface of said refractory hard metal member where the joint is to be made, plating the surface of said refractory hard metal member with a nickel coating of about 0.0005 inch, preheating said refractory hard metal member at a temperature in the range of 750° to 900° C., contacting and brushing the surface of said refractory hard metal member while at said preheating temperature with a molten flux composition comprising, in percent by weight, 48% $Li_3AlF_6$, 32% $Na_3AlF_6$ and 20% NaCl, contacting and brushing said refractory hard metal member with molten aluminum, said aluminum being at 800° C., preheating one end of said flex member, contacting the heated end of said flex member with said flux composition, immersing said end of said aluminum flex member into said molten aluminum, and then directionally cooling said refractory hard metal member, molten aluminum and aluminum flex member by slowly cooling said refractory hard metal member while delaying the cooling of said molten aluminum, thereby forming a joint.

References Cited in the file of this patent

UNITED STATES PATENTS

| | | |
|---|---|---|
| 132,338 | Warden | Oct. 15, 1872 |
| 1,581,446 | Hoxie | Apr. 20, 1926 |
| 1,813,657 | Boothman et al. | July 7, 1931 |
| 2,414,231 | Kraus | Jan. 14, 1947 |
| 2,569,097 | Grange | Sept. 25, 1951 |
| 2,612,442 | Goetzel | Sept. 30, 1952 |
| 2,682,101 | Whitfield et al. | June 29, 1954 |
| 2,735,919 | Shower | Feb. 21, 1956 |
| 2,785,084 | Lundin | Mar. 12, 1957 |

FOREIGN PATENTS

| | | |
|---|---|---|
| 489,569 | Canada | Jan. 13, 1953 |

UNITED STATES PATENT OFFICE

CERTIFICATE OF CORRECTION

Patent No. 3,100,338 August 13, 1963

Jack L. Henry

It is hereby certified that error appears in the above numbered patent requiring correction and that the said Letters Patent should read as corrected below.

Column 2, line 25, strike out "and", first occurrence; column 7, line 18, strike out "a".

Signed and sealed this 26th day of May 1964.

(SEAL)
Attest:

ERNEST W. SWIDER
Attesting Officer

EDWARD J. BRENNER
Commissioner of Patents